Figure 5:
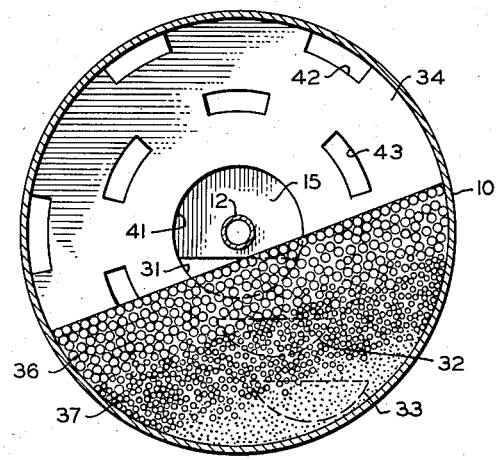

Feb. 3, 1959 L. W. POLLOCK 2,872,300
PROCESS AND APPARATUS FOR SIMULTANEOUSLY PELLETING
POWDERED MATERIALS AND CLASSIFYING SAME
Filed Oct. 18, 1954 2 Sheets-Sheet 1
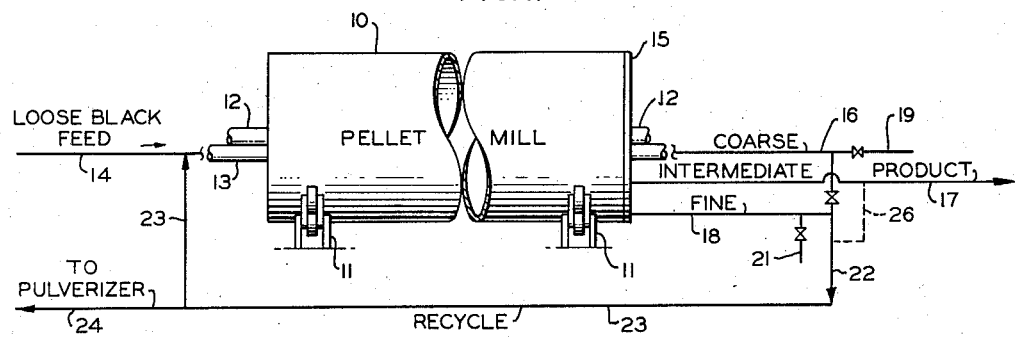
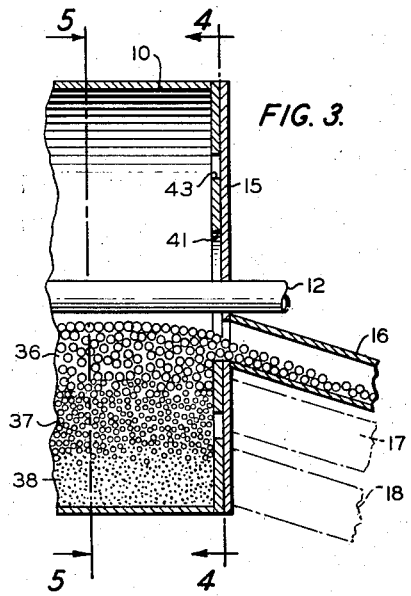
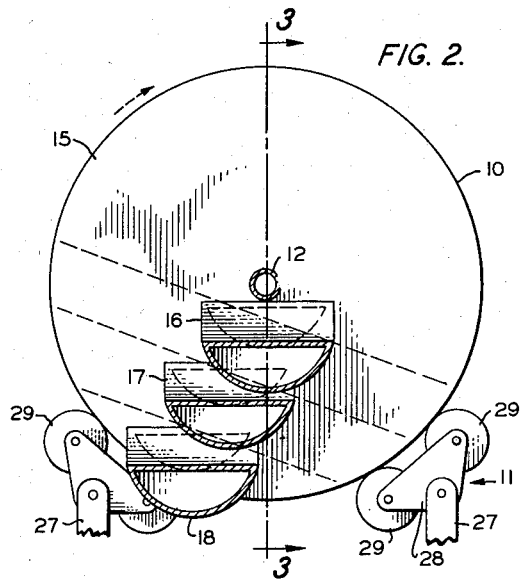
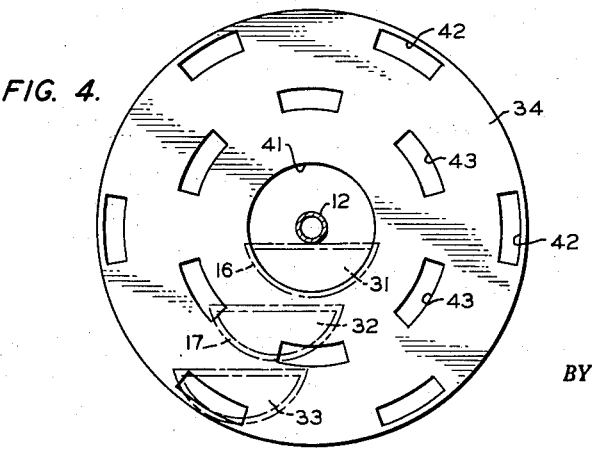
INVENTOR.
L. W. POLLOCK
BY *Hudson & Young*
ATTORNEYS Feb. 3, 1959 L. W. POLLOCK 2,872,300
PROCESS AND APPARATUS FOR SIMULTANEOUSLY PELLETING
POWDERED MATERIALS AND CLASSIFYING SAME
Filed Oct. 18, 1954 2 Sheets-Sheet 2

INVENTOR.
L. W. POLLOCK

BY *Hudson and Young*

ATTORNEYS

United States Patent Office 2,872,300
Patented Feb. 3, 1959

2,872,300

PROCESS AND APPARATUS FOR SIMULTANEOUSLY PELLETING POWDERED MATERIALS AND CLASSIFYING SAME

Lyle W. Pollock, Bartlesville, Okla., assignor to Phillips Petroleum Company, a corporation of Delaware Application October 18, 1954, Serial No. 462,800

16 Claims. (Cl. 23—314)

This invention relates to a process and apparatus for effecting size classification of small aggregates of a broad range of size distribution, such as carbon black pellets. A specific aspect of the invention pertains to a process and apparatus for simultaneously pelleting powdered material and classifying the pellets as to size.

Powdered pelletable materials such as carbon black are conventionally pelleted in a horizontally rotating tumbling zone or mill which keeps the particles in constant rolling agitation so as to cause agglomeration thereof. The effluent pellets are of different sizes and require classification by screening or other means. In the pelleting of carbon black it has been found that the larger sized pellets are more susceptible to breakage in shipment with greater contribution to fines and powder in the shipped product than are the medium sized pellets. It is therefore desirable to segregate the larger and smaller sized pellets from those of an intermediate size in order to provide a better product for shipment and subsequent use. The problem of size classification in the manufacture and/or handling of other particulate materials is common. Powdered metal oxides for catalytic and other uses are often pelleted by tumbling and agglomeration in a manner similar to that applied to carbon black pelleting. Clays are oftentimes pelleted in a similar manner to prepare the same for use as contact material, such as in the percolation of oil or in hydrocarbon conversion or other chemical reactions. Commercial fertilizers and other chemical compounds are also frequently pelleted and the apparatus and process of the invention are applicable to these materials.

Size classification of small particulate solids is usually effected by a screening process utilizing vibrating screens. Such processes entail high maintenance costs because of screen plugging, breaking, and failure of the screen and vibrating equipment. The original cost of the screening equipment for these screening processes is appreciable and contributes to the disadvantages of the screening process. In the carbon black pelleting art pellets discharged from pelleting mills are not of uniform size and are generally classified by rotary or vibratory screens which introduce the usual disadvantage of screening and screening equipment to the process and apparatus.

The principal object of the invention is to provide an improved process and apparatus for effecting size classification of small aggregates of varying size distribution. Another object of the invention is to provide a process for pelleting pelletable powdered material and simultaneously classifying the effluent pellets from the process. A further object of the invention is to provide a process and apparatus for pelleting carbon black and other pelletable materials which discharge the pellets in separate streams in accordance with the size of the pellets directly from the end of the pellet mill and from the end of the pellet bed in the mill. Other objects of the invention will become apparent from a consideration of the accompanying disclosure.

It has been found that small particulate material having fluent properties including pelleted carbon black, sand, pelleted metal compounds, such as catalytic metal oxides, and small granular materials having a relatively broad range of sizes when tumbled in a horizontally rotating mill or tumbling zone separate in accordance with size into a lunar bed with the largest pellets in the top layer and the smallest pellets and particles in the bottom layer with a gradual size gradient between. Thus when fine particulate material is pelleted in a horizontally rotating tumbling zone or mill, the largest pellets at the outlet end of the mill are in the upper surface of a lunar bed formed therein and the finest pellets and particles are in the bottom of the bed with the intermediate and average size pellets of the bed distributed therein in gradually increasing size gradation from the bottom to the top of the bed.

In accordance with the invention, a process and apparatus are provided which recover pellets of different size classification from different levels at the end of the pellet bed at the delivery end of a pellet mill in which the pellets are formed. A series of openings in the rotating end plate of the mill are spaced circumferentially around the mill axis in the delivery end plate, each series being at a given radial distance from the center of the plate so as to permit draw-off of pellets from each series at a given level in the bed. A fixed disc is positioned coaxially with the end plate of the mill and adjacent thereto and openings are provided in this disc in the lower section thereof to coincide with the series of openings in the end plate of the mill and permit recovery of separate classified pellet streams from different levels of the pellet bed as desired. In this manner any suitable number of series of openings in the end plate of the mill and openings in the stationary disc adjacent thereto at levels in the lower section of the bed corresponding to the level of each series of openings in the end plate as it passes thru the lower section of the bed may be provided. It is feasible to utilize a relatively large axial opening in the end plate to function as the series of openings at the highest level in the bed from which pellets are to be removed.

It is also feasible to utilize the apparatus disclosed herein strictly as a classifying device to which is fed material of varying particle sizes and from which the material is recovered in a plurality of separate streams in accordance with the size of the material fed to the classifier, the larger particles being recovered from the uppermost section of the bed, the smallest particles from the lowermost section of the bed, and intermediate size particles from an intermediate section of the bed in one or more streams. Where desired, the material being pelleted and/or classified may be recovered in two separate streams of two separate size classifications as well as in three or more streams.

Figure 6:
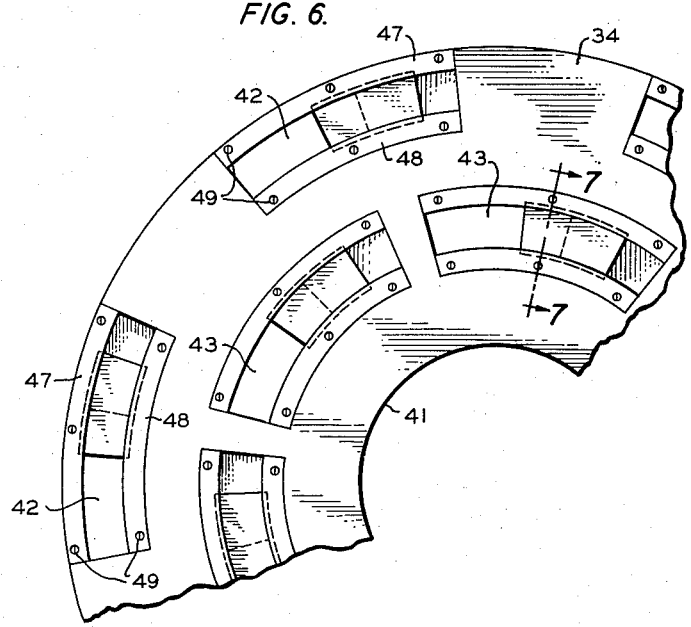
Figure 7:
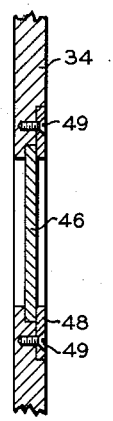

A more complete understanding of the invention may be had from a consideration of the accompanying drawing of which Figure 1 is an elevation showing an arrangement of pelleting apparatus in accordance with the invention; Figure 2 is an end elevation of the pellet mill of Figure 1 cutting across the delivery chutes; Figure 3 is a partial vertical longitudinal cross section of the pellet mill taken on the line 3—3 of Figure 2; Figure 4 is an end view of the pellet mill taken on the line 4—4 of Figure 3; Figure 5 is a vertical, transverse section of the pellet mill taken on the line 5—5 of Figure 3; Figure 6 is a partial section of one embodiment of a mill end-plate showing adjustable pellet openings therein; and Figure 7 is a partial section of the end plate of Figure 6 taken on the line 7—7 showing the adjustable opening detail.

The various views are schematic and corresponding parts are correspondingly numbered.

Referring to Figure 1, the pellet mill comprises a cylindrical drum 10 supported by a wheel and support means 11 and rotatable by any suitable means not shown but conventional in the art. A center pipe 12 extends through the mill usually axially thereof and is supported by posts or pillars (not shown) outside the mill. This support pipe 12 is utilized to support a mill scraper (not shown) inside the mill and also feed conveyor 13 which delivers feed to one or more locations in the front end of the mill. A loose black feed is introduced to conveyor 13 by means of a conveyor line or other feeding device 14. A disc 15 having openings therein for passing pellets is fixed to center pipe 12. Coarse effluent pellets are recovered from the delivery end of the mill thru line 16, intermediate sized pellets thru line 17, and fine or small sized pellets thru line 18. Pellets from lines 16 and 18 may be separately recovered thru lines 19 and 21, respectively, but generally at least a portion of these streams of pellets is recycled thru line 22 to recycle conveyor line 23, which returns any desired proportion of the recycle to the feed end of the mill via line 14 and conveyor 13 or directly to conveyor 13. Where desired a portion of the recycle pellets may be withdrawn thru line 24. Generally, the pellet stream recovered thru line 17 is passed to product; however, a portion of this stream may be conveyed when desired to recycle lines 22 and 23 via line 26.

Referring to Figure 2, mill 10 is supported by supports 11 which comprise supporting posts 27 attached to caster arrangements 28 including wheels 29. Chutes or conduits 16, 17, and 18 are positioned at different levels adjacent the openings 31, 32, and 33 in the fixed disc or plate 15 so as to recover pellets from progressively lower sections of the end of the pellet bed in the mill thru openings in the end plate of the mill hereinafter described.

Figure 3 shows a vertical section of the delivery end of the mill and the delivery conduits 16, 17, and 18 attached to stationary disc 15. End plate 34 is rigidly attached to the end of mill 10 in sealed arrangement therewith such as by welding or other closure means. Openings in end plate 34, shown more clearly in Figure 4, provide a passageway from the pellet bed in the mill thru the end plate 34 and thru fixed disc 15 into delivery conduits or chutes 16, 17, and 18. The pellet bed comprises a coarse upper section 36, an intermediate subjacent section 37, and a relatively fine bottom section 38.

Referring to Figure 4, mill end plate 34 comprises a circular disc attached to and closing the delivery end of the pellet mill. A central or axial opening 41 provides a passageway for pellets into the opening 31 in disc 15 for pellets to move into conduit 16. A series of openings 42 near the periphery of the end plate 34 provide a passageway from the lower section 38 of the pellet bed to opening 33 in disc 15 for pellets to pass into delivery conduit 18. A series of openings 43 intermediate axial opening 41 and openings 42 provide a passageway for pellets from intermediate section 37 of the pellet bed to opening 32 in disc 15 for passage of pellets into delivery conduit 17.

Figure 5 which is a vertical transverse cross section of the mill taken on the line 5—5 of Figure 3 shows openings 41, 42, and 43 in end plate 34 and the corresponding position of openings 31, 32, and 33 in the lower portion of disc 15.

Figures 6 and 7 show an arrangement of adjustable openings in mill end plate 34 which provide for varying the flow of pellets thru these openings. Slidable plate 46 is recessed in end plate 34 and cover plates 47 and 48 are likewise recessed in end plate 34, flush therewith, on the outside of the mill end so as to hold slidable plate 46 in any desired position with respect to openings 42 and 43. Cover plates 47 and 48 are held in position against slidable plate 46 by screws 49. Obviously plates 46 may be adjusted so as to allow full utilization of openings 42 and 43 or they may be moved into a position covering a major portion of the opening by loosening screws 49 sufficiently to free the plate.

Operation of the pellet mill of the invention is described in carbon black pelleting as illustrative of pelleting loose pelletable materials, generally. Loose flocculent carbon black is fed thru line 14 and conveyor 13 into the feed end of pellet mill 10. In pelleting carbon black a portion of the pelleted material is usually recovered from the delivery end of the mill and recycled thru line 23 to feed conveyor 13. Mill 10 is continuously rotated so as to tumble the material fed into the mill and form small generally spherical pellets. These pellets are automatically classified as they progress toward the delivery end of the mill as shown in Figures 3 and 5. The openings 41, 42, and 43 positioned in mill end plate 34 provide passageways thru the end plate for pellets as these openings revolve across the end of the pellet bed and pellets of varying sizes pass thru these openings and thru openings 31, 32, and 33 in fixed disc 15 into delivery conduits 16, 17, and 18, respectively, thereby delivering to any suitable use pellet streams of three different size classifications. The largest pellets recovered from delivery conduit 16 are generally of greater size than is desired because of their tendency to disintegrate to powder during handling and shipment. Hence, pellets from this conduit are usually passed to recycle or to a suitable pulverizer, such as a micropulverizer, and the pulverized carbon black is then returned to the loose black feed. Pellets of more suitable size for product are recovered from conduit 17 and transferred to packaging or storage by means of any suitable conveyor. Where desired a portion of the product stream from conduit 17 may be recycled thru auxiliary line 26. A stream of fine pellets and fines is recovered thru conduit 18 and passed thru line 22 to recycle line 23 along with the large sized pellets from conduit 16. Where desired the stream of coarse pellets from line 16 may be passed directly to a micropulverizer for reduction to fines and subsequent return of this stream to the loose black feed. Fines from conduit 18 may be recycled directly to feed line 14 or conveyor 13 without passing thru the micropulverizer.

As shown in the drawing the pellet bed is higher on the side of the mill which is rotating upwardly and lower on the side of the mill which is rotating downwardly. It is, therefore, desirable to progressively offset openings 31, 32, and 33 from the vertical diameter of the mill end-plate in the direction of upward rotation so as to facilitate proper classification and recovery of the classified streams. The amount of offset depends upon the design of the mill, the depth of the pellet bed maintained in the mill, the speed of rotation of the mill, and the character of the material being pelleted. In any given mill and pelleting or classifying application the proper position of the withdrawal openings 31, 32, and 33 can readily be determined and is well within the skill of the art.

The process and apparatus disclosed herein are also applicable to the classification of a mass of material comprising small particles of varying sizes as well as to the simultaneous pelleting of powdered material and classification of the resulting pellets. In this application of the invention, pelleted material of varying sizes is fed to the mill in the manner described in connection with the operation of the mill in pelleting carbon black and as the pellets or other small aggregates pass thru the mill to the delivery end thereof the same are classified as to size as shown in the drawing and streams of different size classification are recovered in the same manner as described in connection with the pelleting process.

Certain modifications of the invention will become apparent to those skilled in the art and the illustrative details disclosed are not to be construed as imposing unnecessary limitations on the invention.

I claim:

1. A cylindrical pellet mill rotatable on a horizontal axis, having feed inlet means at one end and pellet outlet means at the other comprising a delivery end-plate attached to said mill and rotatable therewith comprising a disc having at least one opening near its periphery and at least one opening spaced radially inwardly from aforesaid opening; a fixed plate parallel to and adjacent said end-plate, having a slot at each level below the center of said end-plate coinciding with the openings in said end-plate when in radial alignment therewith thereby providing a path for pellets thru said end-plate and said fixed plate; and means for separately recovering pellets from each slot in said fixed plate.

2. The apparatus of claim 1 wherein said disc has a series of circumferentially spaced-apart openings near its periphery, and another series of openings circumferentially spaced apart nearer the center of said disc.

3. A cylindrical horizontally rotatable pellet mill having feed inlet means at one end and pellet outlet means at the other comprising a plate closing the end of said mill and rotatable therewith, having a series of circumferentially spaced openings intermediate the periphery and the center thereof and at least one other opening nearer the center of said plate than said series, said openings providing for delivery of pellets from at least two different levels in said mill; a fixed non-rotatable disc coaxial with said mill, adjacent said plate, having a slot therein in the lower portion thereof radially spaced to coincide with said series of openings and another slot spaced above aforesaid slot to coincide with said other opening; and means for separately recovering pellets from each slot in said plate.

4. The apparatus of claim 3 wherein the means for recovering pellets from one of said slots is connected by conveyor means with said feed inlet means.

5. The apparatus of claim 3 wherein said at least one other opening is an axial opening and said apparatus includes a series of openings in said plate circumferentially spaced intermediate said axial opening and first said series of openings; an additional slot in said disc intermediate aforesaid slots positioned to coincide with last said series of openings; and additional means for separately recovering pellets from said additional slot.

6. The apparatus of claim 5 including a recycle line connecting the means for recovering pellets from the uppermost slot and the means for recovering pellets from the lowermost slot with said feed inlet means.

7. The apparatus of claim 3 wherein said slots are elongated circumferentially of said disc and adjustable cover means are associated with said slots to provide for adjustment of the slot length.

8. A process for pelleting a powdered pelletable material which comprises tumbling a bed of said material in a horizontally elongated cylindrical tumbling zone so as to produce pellets of varying sizes and distribute same in gradually decreasing size from the upper to the lower surface in a lunar bed in the lower portion of said zone; continuously feeding loose powdered material to one end section of said zone; intermittently withdrawing pellets at the opposite end of said zone in separate streams from at least two points at two different levels in an upright plane at the end of said bed so as to obtain pellets of two different size classifications.

9. The process of claim 8 wherein a third stream of pellets is withdrawn from a third level in said bed to obtain a stream of a third size classification.

10. The process of claim 9 wherein one level is located adjacent the top surface of the bed, one adjacent the lower section thereof, and one adjacent an intermediate section thereof so as to obtain large, small, and medium sized pellets, respectively, in separate streams; at least a portion of the large and small sized pellets are recycled to the tumbling zone; and at least a portion of the medium sized pellets are recovered as product.

11. The process of claim 8 wherein said material comprises carbon black.

12. The process of claim 8 wherein large pellets are withdrawn in a separate stream directly from the uppermost level of the bed, medium sized pellets are withdrawn in a separate stream directly from an intermediate level, and smaller pellets are withdrawn in a separate stream directly from a lower level in said bed.

13. The combination of a pellet mill end plate comprising a disc adapted for attaching to the delivery end of a pellet mill having at least one opening spaced apart from the circumference of said disc a short distance, at least one additional opening spaced inwardly radially from aforesaid opening and at least one other additional opening spaced closer to the center of said disc than aforesaid openings, said disc being adapted to rotate in a vertical plane about a horizontal axis; a vertical fixed plate parallel to and adjacent said disc, coaxial with said disc, and having a slot at each level below the axis of said disc coinciding with the openings therein when in radial alignment therewith so as to provide a flow path for pellets thru said disc and said plate when said slots and openings are in said alignment; means for supporting said plate independently of said disc; and separate takeoff conduits for pellets sloping downwardly from each slot in said fixed plate.

14. A pellet mill rotatable on a horizontal axis, having a delivery end plate comprising a disc provided with at least one opening near its periphery and at least one opening spaced radially inwardly from aforesaid opening; and a separate conduit means for recovering a separate stream of pellets from each said opening when same is revolved thru the lower section of its arc of rotation.

15. The pellet mill of claim 14 wherein said means comprises a fixed plate coaxial with said end-plate and adjacent same having radially-spaced-apart slots below the axis thereof coinciding with the openings in said end plate during rotation thereof and separate downwardly directed chutes leading from each of said slots.

16. The combination of a pellet mill end plate comprising a disc adapted for attaching to the delivery end of a pellet mill having at least one opening spaced apart from the circumference of said disc a short distance, at least one additional opening spaced inwardly radially from aforesaid opening and at least one other additional opening spaced closer to the center of said disc than aforesaid openings, said disc being adapted to rotate in a vertical plane about a horizontal axis; a vertical fixed plate parallel to and adjacent said disc, coaxial with said disc, and having a slot at each level below the axis of said disc coinciding with the openings therein when in radial alignment therewith so as to provide a flow path for pellets thru said disc and said plate when said slots and openings are in said alignment; means for supporting said plate independently of said disc comprising a shaft attached axially to said plate and extending thru said disc and said plate; and an axial opening in said disc larger than said shaft.

References Cited in the file of this patent

UNITED STATES PATENTS

| | | |
|---|---|---|
| 775,945 | Stebbins | Nov. 29, 1904 |
| 1,211,111 | Dunn | Jan. 2, 1917 |
| 1,837,299 | Taggart | Dec. 22, 1931 |
| 2,021,671 | Skinner | Nov. 19, 1935 |
| 2,543,898 | De Vaney | Mar. 6, 1951 |
| 2,562,647 | Shaver | July 31, 1951 |
| 2,586,818 | Harms | Feb. 26, 1952 |
| 2,638,625 | Studebaker | May 19, 1953 |